United States Patent [19]

Sommer et al.

[11] 4,426,474

[45] Jan. 17, 1984

[54] ORGANOPOLYSILOXANE COMPOSITIONS AND ELASTOMERS FORMED THEREFROM

[75] Inventors: Oswin Sommer; Norman Dorsch; Erhard Bosch, all of Burghausen; August Schiller, Neuötting; Alois Strasser, Burghausen, all of Fed. Rep. of Germany

[73] Assignee: Wacker-Chemie GmbH, Munich, Fed. Rep. of Germany

[21] Appl. No.: 372,905

[22] Filed: Apr. 29, 1982

[30] Foreign Application Priority Data

Jun. 3, 1981 [DE] Fed. Rep. of Germany ....... 3121984

[51] Int. Cl.³ .............................................. C08L 83/06
[52] U.S. Cl. .................................... 524/243; 525/477; 528/28; 528/901
[58] Field of Search ....................... 525/477; 524/243; 528/28

[56] References Cited

U.S. PATENT DOCUMENTS

| | | | |
|---|---|---|---|
| 3,303,163 | 2/1967 | Goossens | 525/477 |
| 3,677,996 | 7/1972 | Kaiser et al. | 525/477 |
| 3,886,118 | 5/1975 | Nitzsche et al. | 525/477 |

Primary Examiner—Wilbert J. Briggs, Sr.

[57] ABSTRACT

Compositions which can be stored under anhydrous conditions but when exposed to moisture crosslink at room temperature to form elastomers, comprising a diorganopolysiloxane having terminal condensable groups, a silicon compound containing at least three hydrolyzable groups per molecule which are bonded to silicon, and an alkylenediamine in which at least one hydrogen atom that is bonded to a nitrogen atom of the alkylenediamine is substituted with a polyalkylene oxide.

6 Claims, No Drawings

ORGANOPOLYSILOXANE COMPOSITIONS AND ELASTOMERS FORMED THEREFROM

The present invention relates to organopolysiloxane compositions and more particularly to room temperature vulcanizable organopolysiloxane compositions and elastomers prepared therefrom.

BACKGROUND OF THE INVENTION

Compositions which can be stored under anhydrous conditions, but when exposed to atmospheric moisture crosslink to form elastomers at room temperature containing a diorganopolysiloxane, an organosilicon compound having at least three hydrolyzable groups bonded to the silicon atom per molecule and containing at least another substance are described in U.S. Pat. No. 4,230,826 to Sommer et al. The compositions described in the patent consist of (1) an organopolysiloxane having terminal condensable groups, (2) a silicon compound having at least 3 Si-bonded hydrolyzable groups per molecule and (3) a powder obtained from the homopolymerization or copolymerization of an acrylonitrile in an aqueous medium.

In contast to the elastomers described in U.S. Pat. No. 4,230,826, the elastomers of this invention have the advantage that they exhibit substantially better adhesion to synthetic substrates upon which they are formed than the elastomers known heretofore. Furthermore, the degree of adhesion of these elastomers is not dependent on the type of hydrolyzable groups present in the room temperature vulcanizable composition.

Therefore, it is an object of the present invention to provide organopolysiloxane compositions which exhibit improved adhesion properties. Another object of this invention is to provide room temperature vulcanizable compositions which will adhere to synthetic substrates. Still another object of the present invention is to provide organopolysiloxane compositions having non-slump properties. A further object of this invention is to provide elastomers whose degree of adhesion is not dependent on the hydrolyzable groups present in the composition.

SUMMARY OF THE INVENTION

The foregoing objects and others which will become apparent from the following description are accomplished in accordance with this invention, generally speaking, by providing compositions containing a diorganopolysiloxane having terminal condensable groups, an organosilicon compound having at least three hydrolyzable groups per molecule which are bonded to silicon and an alkylenediamine in which at least one nitrogen-bonded hydrogen atom is substituted with a polyalkylene oxide.

DETAILED DESCRIPTION OF THE INVENTION

The alkylenediamines having at least one nitrogen-bonded hydrogen atom substituted with a polyalkylene oxide are commercially available and may be prepared for example by the addition of ethylene oxide or propylene oxide or the addition of both ethylene oxide and propylene oxide to an alkylenediamine. It is preferred that the polyalkylene oxide consist of ethylene oxide and propylene oxide units.

When the polyalkylene oxide contains various alkylene oxide units, then the units may be randomly distributed or in the form of blocks.

It is preferred that the molecular weight of the polyalkylene oxides be on the order of from about 200 to about 10,000 per mol of alkylenediamine.

The preferred alkylenediamine is ethylenediamine. Other alkylene diamines which may be used are 1,2-diaminopropane, 1,3-diaminopropane, 1,3-diaminobutane, 1,5-diaminopentane or hexamethylenediamine.

For each molecule of alkylenediamine, 1, 2, 3 or 4 nitrogen-bonded hydrogen atoms may be substituted with a polyalkylene oxide. It is preferred that for each molecule of alkylenediamine that four such hydrogen atoms be substituted with a polyalkylene oxide.

It is preferred that the alkylene diamine in which at least one nitrogen-bonded hydrogen atom is substituted with polyalkylene oxide be an alkylenediamine of the general formula

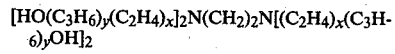

where each x and y represent the same or different integers having an average value of at least 5.

It is preferred that the compositions of this invention contain the alkylenediamine, in which at least one nitrogen-bonded hydrogen atom is substituted with polyalkylene oxide, in an amount of from about 0.1 to 5 percent by weight, based on the total weight of the composition.

The compositions of this invention can be prepared from the same diorganopolysiloxane having terminal condensable groups which have been or could have been used heretofore in the preparation of compositions which can be stored under anhydrous conditions, but when exposed to moisture, crosslink at room temperature to form elastomers. These compositions contain a diorganopolysiloxane having terminal condensable groups and a silicon compound containing at least three silicon bonded hydrolyzable groups per molecule and an alkylenediamine in which at least one nitrogen-bonded hydrogen atom is substituted with a polyalkylene oxide. The diorganopolysiloxanes having terminal condensable groups generally used in the manufacture of such compositions and which are also preferred in the present invention, may be represented by the general formula

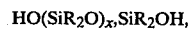

in which R represents the same or different monovalent hydrocarbon radicals or substituted monovalent hydrocarbon radicals and x' is an integer having a value of at least 10.

Although this is generally not shown in formulas of this type, siloxane units other than the diorganosiloxane units $(SiR_2)O$ may be present within or along the siloxane chain of the above formula. Examples of such other siloxane units which are generally present only as impurities are those of the formulas $RSiO_{3/2}$, $R_3SiO_{1/2}$ and $SiO_{4/2}$, where R is the same as above. It is preferred that siloxane units other than the diorganosiloxane units not exceed about 10 mole percent and, more preferably, that they not exceed about 1 mole percent, per mole of the diorganopolysiloxane having terminal condensable groups.

The hydroxyl groups in the above formula may be partially or totally substituted with condensable groups other than Si-bonded hydroxyl groups. Examples of such other condensable groups are especially alkoxy groups having from 1 to 5 carbon atoms and alkoxyalkyleneoxy groups having from 1 to 5 carbon atoms, such as the methoxyethyleneoxy radical. Other groups which may be partially or totally substituted for the condensable groups are hydrolyzable groups such as acyloxy groups, amino groups, aminoxy groups, acylamino groups, oxime groups and phosphate groups. When the condensable groups in the diorganopolysiloxane are hydrolyzable groups, these hydrolyzable groups need not be the same as the hydrolyzable groups which are present on the silicon compound having at least three silicon-bonded hydrolyzable groups, per molecule, which are generally referred to as "crosslinkers".

Examples of hydrocarbon radicals represented by R are alkyl radicals, such as the methyl, ethyl, n-propyl and the isopropyl radical, as well as octadecyl radicals; alkenyl radicals such as the vinyl and the allyl radical; cycloaliphatic hydrocarbon radicals, such as the cyclopentyl and cyclohexyl radicals, as well as methylcyclohexyl and cyclohexenyl radicals; aryl radicals such as the phenyl and xenyl radicals; aralkyl radicals such as the benzyl, beta-phenylethyl and the beta-phenylpropyl radicals; and alkaryl radicals such as the tolyl radicals.

Preferred substituted hydrocarbon radicals represented by R are haloaryl radicals such as the chlorophenyl and bromophenyl radicals; and the cyanoalkyl radicals, such as the beta-cyanoethyl radical.

It is preferred that at least 50 percent, and more preferably at least 90 percent of the number of R radicals in the above formulas, i.e., the SiC-bonded radicals in the diorganopolysiloxane having terminal condensable groups, be methyl radicals.

It is possible to use mixtures consisting of various diorganopolysiloxanes having terminal condensable groups in preparing the compositions of this invention.

The viscosity of the diorganopolysiloxane having terminal condensable groups is preferably between 100 and 500,000 mPa.s at 25° C.

In preparing the compositions of this invention, it is possible to use as silicon compounds containing at least three silicon-bonded hydrolyzable groups per molecule, any silicon compounds of this type which could heretofore be used for the preparation of compositions which can be stored under anhydrous conditions, but when exposed to water at room temperature, crosslink to form elastomers by mixing at least one such silicon compound with a diorganopolysiloxane containing terminal condensable groups.

Examples of silicon compounds having at least three silicon-bonded hydrolyzable groups per molecule which can be used in preparing the compositions of this invention, are silanes having the general formula

where R is the same as above, Z represents a hydrolyzable group and a is 0 or 1, and partial hydrolysates of these silanes containing from 2 to 15 silicon atoms per molecule.

Examples of hydrolyzable groups represented by Z are acyloxy groups ($-OOCR'$), hydrocarbonoxy groups and substituted hydrocarbonoxy groups ($OR'$), hydrocarbonoxy-hydrocarbonoxy groups ($-OR''OR'$), where R'' is a bivalent hydrocarbon radical, for example the $-(CH_2)_2$ radical, aminoxy groups ($-ONR'_2$), amino groups ($-NR'_2$), acylamino groups ($-NR'COR'$), oxime groups ($-ON=CR'_2$) and phosphate groups [$-OOP(OR')_2$]. In these formulas R' represents the same or different hydrocarbon radicals and substituted hydrocarbon radicals. In at least some of the previously cited formulas, at least one R' may represent hydrogen. The examples of hydrocarbon radicals represented by R are equally applicable to hydrocarbon radicals represented by R' and the examples of substituted hydrocarbon radicals represented by R are equally applicable to substituted hydrocarbon radicals represented by R'.

Examples of acyloxy groups are especially those having from 1 to 18 carbon atoms, such as formyloxy, acetoxy, propionloxy, valeroyloxy, 2-ethylhexoyloxy, myristyloxy and stearoyloxy groups. The acetoxy groups are the preferred acyloxy radicals.

Examples of hydrocarbonoxy groups are especially alkoxy groups having from 1 to 10 carbon atoms, such as the methoxy, ethoxy, n-propoxy, isopropoxy, butoxy, hexyloxy, heptyloxy and octyloxy groups, as well as other hydrocarbonoxy groups having from 2 to 10 carbon atoms, such as vinyloxy, allyloxy, ethylallyloxy, isopropenyloxy, butadienyloxy and phenoxy groups.

An example of a hydrocarbonoxy-hydrocarbonoxy group is the methoxyethylenoxy group.

Examples of aminoxy groups are dimethylaminoxy, diethylaminoxy, dibutylaminoxy, dioctylaminoxy, dicyclohexylaminoxy, diphenylaminoxy, ethylmethylaminoxy and methylphenylaminoxy groups.

Examples of amino groups are n-butylamino, sec-butylamino and cyclohexylamino groups.

An example of an acylamino group is the benzoylmethylamino group.

Examples of oxime groups are acetaldoxime, acetophenoxime, acetonoxime, benzophenonoxime, 2-butanonoxime, diisopropylketoxime and chlorocyclohexanonoxime groups.

Examples of phosphate groups are dimethylphosphate, diethylphosphate, di-n-butylphosphate, dioctylphosphate, methylethylphosphate, methylphenylphosphate and diphenylphosphate groups.

The silicon compound containing at least three hydrolyzable groups per molecule that are bonded to silicon, is preferably used in an amount of from about 0.5 to 15 percent by weight, based on the weight of the diorganopolysiloxane having terminal condensable groups.

In addition to the diorganopolysiloxane having terminal condensable groups, the silicon compound containing at least three hydrolyzable groups per molecule that are bonded to silicon and the alkylenediamine in which at least one nitrogen-bonded hydrogen atom is substituted with a polyalkylene oxide, the compositions of this invention may also contain any other substances which have been or could have been used heretofore in preparing compositions which can be stored under anhydrous conditions, but when exposed to moisture at room temperature, crosslink to form elastomers containing a diorganopolysiloxane having terminal condensable groups and a silicon compound having at least three silicon-bonded hydrolyzable groups per molecule.

Examples of other substances which may also be added to the compositions of this invention are organic fillers having a surface area of at least 20 m²/g, inorganic fillers having a surface area of less than 20 m²/g, pigments, soluble dyes, fragrances, organopolysiloxane resins including those containing (CH$_3$)$_3$SiO$_{1/2}$ and SiO$_{4/2}$ units, pure organic resins such as polyvinyl chloride powder or powders of homopolymers or copolymers of acrylonitrile, ethylene, vinyl acetate or styrene. These pure organic resins may be prepared in the presence of a diorganopolysiloxane having terminal condensable groups. Other additives which may be included in the compositions are corrosion inhibitors, oxidation inhibitors, bactericides, fungicides, heat stabilizers, solvents, compounds to improve elastomeric adhesion on substrates on which they are applied, such as gammaglycidoxypropyltriethoxysilane, condensation catalysts such as tin salts or organotin salts of carboxylic acids, for example dibutyltin dilaurate; emollients such as dimethylpolysiloxanes which are end-blocked by trimethylsiloxy groups and which are liquid at room temperature, or phosphoric acid esters or mixtures of the aforementioned emollients, photo-protective agents and cell-generating agents such as azodicarbonamide.

Examples of inorganic fillers having a surface area of at least 20 m$^2$/g are pyrogenically produced silicon dioxides, silicic acid hydroxides which have been dehydrated while maintaining their structure, and metal oxides, such as titanium dioxide, ferric oxide, aluminum oxide and zinc oxide, provided that they have an area weight of at least 20 m$^2$/g. (The area weight factors indicated for fillers within this specification are BET values, i.e., values that have been determined on the basis of nitrogen absorption in accordance with ASTM Special Technical Publication, No. 51, 1941, page 95).

Examples of fillers having an area of less than 20 m$^2$/g are quartz meal, diatomaceous earth, Neuberg Chalk, calcium silicate, zirconium silicate, calcium carbonate, for example in the form of ground chalk, calcined aluminum silicate and powdered sodium aluminum silicate having molecular sieve properties.

Fibrous fillers such as asbestos or glass fibers or mixtures of the aforementioned fibers, especially those having an average length no greater than about 0.5 mm, or organic fibers, or mixtures of organic fibers and inorganic fibers may be used as well.

At least a part of or all of the above-mentioned inorganic fillers may be treated with hydrophobic agents to impart hydrophobic properties thereto. For example, the inorganic fillers may be treated with dimethylchlorosilane or trimethylethoxysilane or with stearic acid or with a mixture of two or more of such hydrophobic agents. If desired, these fillers may be treated with a hydrophobic agent in, for example, a ball mill.

In preparing the compositions of this invention, it is possible to use mixtures consisting of various fillers having an area of at least 20 m$^2$/g or fillers with an area of less than 20 m$^2$/g, or mixtures containing at least one filler with an area of at least 20 m$^2$/g and at least one filler with an area of less than 20 m$^2$/g.

The compositions of this invention may be prepared by mixing the constituents in any sequence. It is preferred that the mixing take place at room temperature and under anhydrous conditions. If desired, the mixing process may, however, also take place at temperatures higher than room temperature, for example at a temperature of from 35° to 150° C.

The moisture in the air is generally sufficient to crosslink the compositions of this invention. When desired, crosslinking may also take place at temperatures higher or lower than room temperature, for example, at between −5° C. to +10° C. Crosslinking may also be carried out at water concentrations which exceed the normal moisture content of the air, for example in aqueous steam.

The compositions of this invention may be used to seal horizontal, inclined or vertical fissures and similar cavities having widths of, for example, 10 mm up to 50 mm. They may be used to seal fissures or cavities in buildings, land vehicles, aircraft or boats. Also, the compositions of this invention may be used as adhesives especially for pure organic plastic substances such as polyvinylchloride, polyamides or epoxy resins, as well as for wood and for the coating of a great variety of substrates, including woven and nonwoven fabrics. They may also be used in manufacturing molded objects, including electrical insulations and for puttying windows.

In the following examples all parts are by weight, unless otherwise specified.

Example 1

About 65 parts of a dimethylpolysiloxane containing an Si-bonded hydroxyl group in each of its terminal units and having a viscosity of 80,000 mPa.s at 25° C., are mixed in a planetary mixer at room temperature and at 10 mbar (absolute) with 23 parts of a trimethylsiloxy end-blocked dimethylpolysiloxane which has a viscosity of 100 mPa.s at 25° C., and 6 parts of methyltriacetoxysilane, 8 parts of pyrogenically produced silicon dioxide, and 1 part of ethylenediamine in which at least one nitrogen-bonded hydrogen atom is substituted with a polyalkylene oxide and which was prepared by the addition to the ethylenediamine of 20 moles of ethylene oxide and 20 moles of propylene oxide per mole of ethylene diamine. The composition obtained exhibited non-slump properties, i.e., the composition did not flow out of vertical or inclined fissures prior to crosslinking. The composition could be stored under anhydrous conditions and when exposed to aqueous steam in atmospheric air, formed an elastomer.

Comparison Example (a)

The process described in Example 1 was repeated, except that substituted and unsubstituted ethylenediamine was omitted.

Example 2

A planetary mixer is used to mix at room temperature and at 10 mbar (absolute), 58 parts of a dimethylpolysiloxane which has an Si-bonded hydroxyl group in each of its terminal units and a viscosity of 80,000 mPa.s at 25° C., with 27 parts of a trimethylsiloxy end-blocked polysiloxane which has a viscosity of 100 mPa.s at 25° C., 9.5 parts of pyrogenically produced silicon dioxide, 4.5 parts methyltris-(cyclohexylamino)-silane and 1 part of ethylenediamine in which at least one nitrogen-bonded hydrogen atom has been substituted with a polyalkylene oxide and which was prepared by the addition to the ethylenediamine of 20 moles of ethylene oxide and 20 moles of propylene oxide per mole of ethylenediamine. The composition obtained exhibited non-slump properties and could be stored under anhydrous conditions and when exposed to aqueous steam in atmospheric air, formed an elastomer.

Comparison Example (b)

The process described in Example 2 was repeated, except that substituted and unsubstituted ethylenediamine was omitted.

EXAMPLE 3

The process described in Example 2 was repeated, except that 4.5 parts of methyltris-(2-butanonoxime)-silane were substituted for the 4.5 parts of methyltris-(cyclohexylamino)-silane. The composition obtained exhibited non-slump properties and could be stored under anhydrous conditions and when exposed to aqueous steam in atmospheric air, formed an elastomer.

Comparison Example (c)

The process described in Example 3 was repeated, except that substituted and unsubstituted ethylenediamine was omitted.

Strands of compositions prepared in accordance with the Examples and the Comparison Examples were placed on panels made of the materials listed in the following table and exposed to atmospheric moisture. The strands cured to form elastomers. The thus-treated panels were then stored under water at room temperature for 3 weeks. The following table shows the results obtained when the elastomers were removed from their respective substrates.

TABLE

| Panel material | Example (1) | Comparison Example (a) | Example (2) | Comparison Example (b) | Example (3) | Comparison Example (c) |
|---|---|---|---|---|---|---|
| Polyvinyl chloride | K | A | K | A | K | A |
| Polymethacrylate | K | A | K | A | K | AK |
| Epoxy resin | K | AK | K | A | K | AK |
| Melamine resin | K | A | K | A | K | A |
| Polyurethane | K | A | K | A | K | A |
| Sipo* wood** | K | A | K | A | K | A |
| Sipo* wood*** | K | A | K | A | K | AK |
| Polyamide | K | A | K | A | K | K |

Definitions:
A = Adhesion tear (separation between strand of elastomer and the panel).
K = Cohesion tear (tear in elastomer strand).
AK = Adhesion and cohesion tear.
*Hard, durable, reddish-brown, bluish-purple wood of Entrandrophragma utile.
**Coated with commercial white alkyd resin lacquer.
***Coated with commercial "Xyladecor" [registered trademark] wood protection agent which simultaneously serves as a colorless varnish.

What is claimed is:

1. A composition which can be stored under anhydrous conditions, but when exposed to moisture at room temperature, crosslinks to form an elastomer comprising a diorganopolysiloxane having terminal condensable groups, a silicon compound having at least three hydrolyzable groups per molecule which are bonded to silicon, and at least one alkylenediamine in which at least one nitrogen-bonded hydrogen atom is substituted with a polyalkylene oxide.

2. The composition of claim 1, wherein the polyalkylene oxide contains ethylene oxide and propylene oxide units.

3. The composition of claim 1, wherein the alkylenediamine is ethylenediamine.

4. The composition of claims 1, 2 or 3, wherein the alkylenediamine having at least one nitrogen-bonded hydrogen substituted with a polyalkylene oxide is present in the composition in an amount of from 0.1 to 5 percent by weight based on the weight of the composition.

5. The composition of claim 1, wherein the alkylenediamine is obtained from the reaction of an alkylene oxide and an alkylenediamine.

6. The composition of claim 5, wherein the alkylene diamine is ethylenediamine and the alkylene oxide contains ethylene oxide and propylene oxide units.

* * * * *